Figure 1:
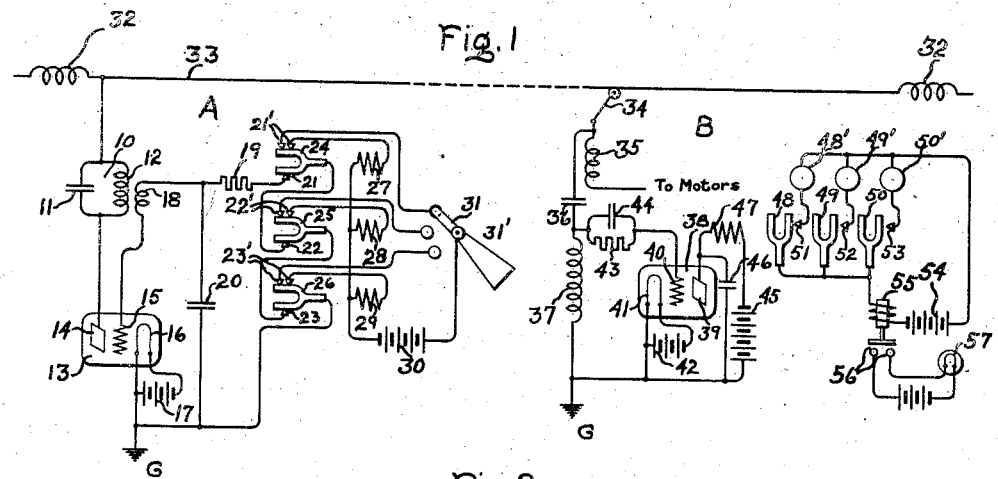

July 15, 1930.　　　　D. C. PRINCE　　　　1,770,805

RAILWAY SIGNALING SYSTEM

Filed Aug. 9, 1928

Inventor:
David C. Prince
by Charles O'Mullar
His Attorney.

Patented July 15, 1930

1,770,805

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

RAILWAY SIGNALING SYSTEM

Application filed August 9, 1928. Serial No. 298,509.

My invention relates to railway signaling systems and more particularly to signaling systems for use in connection with the well known block signaling systems now commonly employed in railway practice. It has for its purpose to provide improved means of the type indicated whereby a continuous indication in the cab of the locomotive or other moving vehicle, of the condition of the track ahead may be had.

In the well known block signaling systems now almost universally employed in railway practice very reliable means have been devised whereby block signals located along the track may be controlled in response to the condition of the track, or in response to the position of vehicles upon the portion, or the block, or blocks, of the track with which any particular signal is associated. In accordance with my present invention I provide means which may be utilized in connection with such signaling systems, as already devised, whereby the condition of the track ahead may be indicated upon the locomotive, or vehicle. This means, according to the form of my invention presently to be disclosed, comprises means for supplying to a suitable conductor, such as the trolley wire, which extends through each of the blocks, high frequency current. This means preferably comprises a suitable high frequency oscillation generator located in each block and adapted to supply current to the track conductor extending through the block, the current supplied to the conductor of each block being confined to that block in which it is supplied. Additional means are provided whereby the high frequency current which is supplied to each block is modulated in a predetermined manner in accordance with the position of the block signal which is associated with the particular block in which the oscillation generator is located. Each vehicle, which is to be operated in accordance with the track signals, is equipped with means whereby the high frequency current from the track conductor is received and demodulated, the current resulting from demodulation being supplied to suitable visual or audible indicating apparatus whereby the position of the track signal may be repeated upon the locomotive. With means, as thus indicated, and as will be more fully described hereinafter, it will appear that the operator upon the moving vehicle may be continuously informed of the condition of the track ahead by indicating means located upon the vehicle which operate with substantially the reliability of the track signals. Of course, the operation of these indicating means is subject to such faults, in addition to those inherent in the operation of the track signals, as occur resulting from operation of the additional equipment provided in accordance with my invention. For this reason I provide means on the locomotive operable responsively to any fault existing in the equipment provided in accordance with my invention which would render the equipment inoperative to produce proper signals upon the locomotive. Upon receiving such an indication the operator is informed that the equipment is not properly functioning and that he may then rely upon the track signals as in present practice.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents a circuit which may, in accordance with my invention, be associated with each of the block signals together with a diagram of the equipment which is carried by the vehicle; and in which Fig. 2 represents the invention as associated with a block signaling system.

Figure 2:
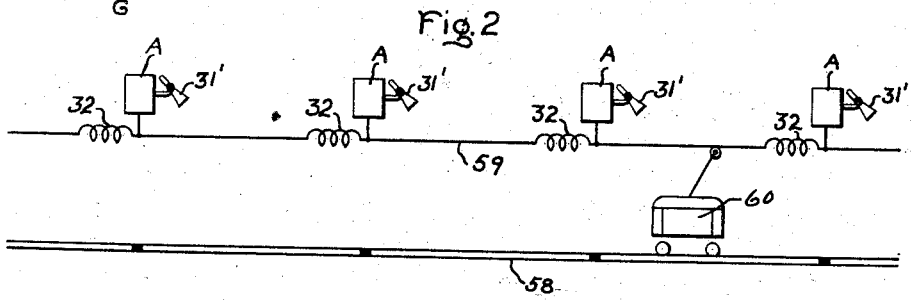

Referring to Fig. 1 of the drawing I have indicated at A an oscillation generator, such as may be associated with each track signal of the railway system and at B the equipment which is mounted upon each of the vehicles which is operated in accordance with the track signals.

The oscillation generator A is provided with the usual tuned circuit 10, consisting of the condenser 11 and inductance 12 connected in parallel. This tuned circuit is connected in the anode circuit of a three element electron discharge device 13 having an anode 14, a grid 15 and a filament or cathode 16. The grid 15 is connected to the cathode 16 through the coil 18, which is inductively coupled with the coil 12 of the circuit 10, and the grid leak 19 shunted by the condenser 20. In series with the grid leak 19 are a plurality of normally closed contacts 21, 22, 23 operated respectively by corresponding tuning forks 24, 25, 26. The tuning forks 24, 25, 26 are electromagnetically operated and may be of any well-known type, having operating windings 27, 28, 29, respectively. These operating windings are energized from a battery 30, or other suitable source, through the selective switch 31 and suitable contacts 21', 22', 23' on the tuning fork, these circuits comprising the usual driving, or buzzer, circuits for the tuning forks. The position of the selective switch 31 may be determined by a direct mechanical engagement with the block signal 31', or by any well-known means associated with the relays or other means which operate the block signal and in each of its different positions, corresponding to different conditions of the track signal, a circuit is completed for one of the tuning forks. While the tuning forks arranged as described comprise a preferred means for modulating current produced by the oscillation generator it will be understood that other means may also be employed.

The transmitter A, as illustrated, receives energy directly from the trolley circuit comprising the trolley wire 33 and ground G. Its constants are so relationed that it generates an oscillating current of an ultra-audible, or radio, frequency as well understood in the art. Upon energization of any one of the electromagnetic tuning forks 24, 25, 26 the grid leak circuit of the transmitter is interrupted through the corresponding normally closed contacts 21, 22 or 23 at a frequency equal to the resonant frequency of the energized tuning fork. This interruption of the grid leak circuit modulates the current output of the transmitter at the same frequency, as is also well understood in the art. The high frequency modulated current thus generated is delivered to the trolley circuit and is confined within its respective block by means of the high frequency choke coils 32 which are interposed in the trolley circuit between each block.

The high frequency modulated current delivered to the trolley circuit is utilized to give an indication on the moving vehicle by means of the receiver B and associated indicating apparatus. Preferably all of the oscillation generators operate at the same frequency, this frequency corresponding to the frequency to which the equipment B is adapted to respond. This high frequency current is collected along with the current for the translating devices of the vehicle through the pantograph or trolley 34, but is excluded from the motors by means of the high frequency choke 35. From the trolley, the high frequency current passes through a tuned circuit consisting of the capacity 36 and inductance 37 connected between the trolley and ground. This current is rectified and amplified by the detector 38, which is an ordinary three element electron discharge device having an anode 39, grid 40 and cathode 41, energized from a battery 42 or other suitable source. The usual grid leak and condenser combination 43, 44 are provided in the grid circuit of the device 48. The energy for the output of the detector 38 may be supplied from a battery 45. A condenser 46 is provided to shunt any high frequency current that might be set up in the output circuit.

The indicating devices are energized from the output of the detector 38. In the arrangement shown, an electromagnet 47 is serially connected in the output circuit. This may consist of a single electromagnet 47 arranged to influence each of a plurality of frequency responsive means such as tuning forks 48, 49, 50 each of which correspond to a position of the track signal or may comprise a plurality of separate coils, one corresponding to each of the frequency responsive devices. The tuning forks 48, 49, 50 have associated therewith normally open contacts 51, 52, 53 respectively which are intermittently closed upon vibration of the tuning forks. In circuit with the contacts 51, 52, 53 are the indicating devices 48', 49', 50' respectively, which may be red, yellow and green lamps or any other suitable indicating means, visual or audible or both, and which indicate the position of the block signal. These indicating devices may be supplied in parallel from a battery 54 such that upon operation of any tuning fork a circuit is closed through the tuning fork and the particular indicating device which is associated therewith. Connected in the common lead of the circuit of battery 54 is a relay 55 which is utilized to operate any suitable signal apparatus 57, or, if desired, suitable train control apparatus such as the brakes.

The operation of the system as thus arranged is as follows: The selector switch 31 occupies a position corresponding to the position, or other condition, of the block signal 31', which may, of course, be of any suitable type, thereby energizing one of the electromagnetic tuning forks. The vibration of any one of the tuning forks interrupts the grid leak of the oscillator at the resonant frequency of the tuning fork and modulates the output of the oscillator at the same frequency. This high frequency modulated current is delivered to the trolley wire 33, or other conductor used for the purpose, and is received on the moving vehicle through the trolley, or pantograph or other suitable means, this current is then rectified and amplified in the detector 38 and a pulsating current of the modulating frequency is caused to flow in the output current of the detector. This pulsating current is utilized to selectively operate the tuning fork which is resonant at that frequency, and the resulting vibration intermittently closes the contact associated with the tuning fork to energize the corresponding signal device and give a visual or other indication of the position of the block signal.

It will be seen that since the block signal 31' is always in one of its, as illustrated, three positions, one of the tuning forks 24, 25, 26 is always in vibration and similarly a corresponding tuning fork 48, 49, 50 is always in vibration. This vibration of some one of the tuning forks 48, 49, 50 maintains the relay 55 continuously energized with the result that its contacts are maintained open and the indicating device 57 is normally deenergized. The operator is thus informed by the deenergized condition of the signaling device 57 that the equipment is properly functioning. Upon the occurrence of any fault in the equipment, such as a failure of one of the modulating devices, failure of the energizing circuit of either the oscillator or detector, or substantially any other failure which might occur, the relay 55 will be deenergized, thereby closing its contacts and energizing the signaling device 57. The operator is then informed that the system is no longer functioning properly and that he should rely upon the track devices for the necessary signals.

In Fig. 2 the application of the equipment, as shown in Fig. 1 to a block signaling system, is illustrated. In this figure, the track 58 is represented as being divided into blocks in accordance with the usual block signal system. A suitable conductor extends through each of the different blocks and is adapted to convey high frequency currents from the oscillation generators A, one of which is associated with each block, to the signal apparatus B, which is located on the different vehicles, one of which is represented at 60, as the vehicle traverses the block in which a particular apparatus A is located. In electric railway systems the conductor 59 may comprise the usual trolley conductor which is utilized to supply energy to the motors of the vehicle 60. This conductor may also comprise any other suitable conductor extending through the different blocks of the system. This conductor is divided into sections by means of the choke coils 32 which are located at the extremities of the different blocks. By means of these choke coils high frequency currents, which are supplied to a particular block by any of the oscillation generators A are confined to that block by means of the choke coils located at the extremities thereof. In this way as the vehicle 60 traverses any particular block it receives a signal corresponding to the position of the track signal of that block and this indication is not interfered with by the position of track signals in other blocks.

While I have shown and described a particular embodiment of my invention it will of course be understood that I do not wish to be limited thereto since many modifications, both in the circuit arrangement and in the instrumentalities employed may be made without departing from the spirit and scope of my invention as set forth in the appended claims.

What I claim as new and desire to secure by Letters Patent of the United States, is:

1. In a railway signaling system, a track signal, means for generating a high frequency alternating current, means for modulating said current at a frequency dependent upon the condition of said track signal, means for transmitting said current to a vehicle to be controlled in accordance with said track signal, and means carried by said vehicle responsive to said current to indicate the condition of said track signal.

2. In a railway signaling system, a signal located along the track of said railway and operable to a plurality of positions dependently upon track conditions, means for generating a high frequency alternating current, means for modulating said current at a frequency dependent upon the position of said track signal, means responsive to said current carried by a vehicle to be controlled by said track signal to continuously indicate the position of said track signal, and indicating means operable in response to a failure of the signaling circuit.

3. In a railway signaling system, a track signal, a high frequency oscillator having a grid leak circuit, means for modulating the current wave produced by said oscillator comprising a series of resonant devices, each of said devices being arranged to interrupt the grid leak circuit of said oscillator in a manner determined by the position of said track signal, means for supplying current from said oscillator to a vehicle to be controlled in accordance with the track signal and a receiver carried by said vehicle including means responsive to the modulation of said current wave to indicate the position of said track signal.

4. In a railway signaling system, a track signal, a high frequency oscillator, means for modulating the current wave of said oscillator at a frequency dependent upon the position of said track signal, a receiver carried by a vehicle to be controlled by said track signal, said receiver being connected to be supplied with current from said oscillator and comprising a detector and a plurality of resonant devices responsive to the output of said detector to indicate the position of said track signal.

5. In a railway signal system, a track signal, a vehicle to be operated in accordance with the track signal, means for continuously supplying current to the vehicle having a frequency which is determined by the condition of the track signal, a receiver mounted upon the vehicle including a plurality of resonant devices each of said devices being responsive to current produced by said means, indicating means controlled by each of said resonant devices and an additional indicating means operable responsively to failure of any of said resonant devices to operate.

6. In a railway signal system comprising a plurality of blocks and having a track signal located in each block, a conductor extending through all of said blocks, means in each block for supplying high frequency current to the conductor, means for modulating said high frequency current supplied in each block in a manner determined by the condition of the track signal of the respective block, a vehicle to be controlled in accordance with said track signals and means mounted upon the vehicle responsive to said modulations for indicating the condition of the track signal.

7. In a railway signaling system comprising a plurality of blocks and having a track signal located in each block, a conductor extending through all of said blocks, means in each block for supplying high frequency current to said conductor, said current being modulated in a manner determined by the condition of the track signal of the respective block and all of said means supplying current of a common frequency, means for confining the current supplied by each means to its respective block, and means mounted on a vehicle to be controlled in accordance with the track signal, which is responsive to the modulation of said currents of common frequency for indicating the condition of the track signals.

In witness whereof, I have hereunto set my hand this 8th day of August, 1928.

DAVID C. PRINCE.